United States Patent

[11] 3,634,166

[72] Inventors Hans Frielingsdorf
Bad Duerkheim;
Heinz Mueller-Tamm, Ludwigshafen;
Dieter Mahling, Nueleiningen, all of
Germany
[21] Appl. No. 853,121
[22] Filed Aug. 26, 1969
[45] Patented Jan. 11, 1972
[73] Assignee Badische Anilin- & Soda-Fabrik
Aktiengesellschaft
Ludwigshafen am Rhine, Land
Rheinland-Pfalz, Germany
[32] Priority Aug. 27, 1968
[33] Germany
[31] P 17 79 556.1

[54] PRODUCTION OF FLAT STRUCTURAL
SANDWICH CONSTRUCTIONS
7 Claims, 1 Drawing Fig.
[52] U.S. Cl............................................... 156/244,
156/306, 156/309, 156/311, 156/322, 156/324
[51] Int. Cl....................................................... B29c 19/00
[50] Field of Search............................................ 156/244,
306, 309, 324, 311, 250

[56] References Cited
UNITED STATES PATENTS
3,265,556  8/1966  Hungerford et al............ 156/324 X
3,360,415  12/1967  Hellman et al................. 156/324 X Primary Examiner—Carl D. Quarforth
Assistant Examiner—Stephen J. Lechert, Jr.
Attorney—Johnston, Root, O'Keeffe, Keil, Thompson & Shurtleff ABSTRACT: A process for the production of sandwich constructions consisting of (a) an inner ply of polyethylene; (b) adhesion-promoting interlayers applied to both sides of the inner ply and (c) outer plies of metal applied to the two interlayers. It is a characteristic feature of the invention that sheeting is prepared continuously from a special polyethylene by means of a screw extruder at a specific temperature of the material, this sheeting is covered on both sides with a film of a special polymer by means of a pair of rollers, the resultant laminate is then covered continuously by means of a pair of rollers at a specific temperature of the material with metal sheeting having a specific temperature and the whole is combined to form a sandwich panel under a specific roller pressure. The process gives sandwich constructions having particularly good chemical and physical properties in a simple way.

PATENTED JAN 11 1972
3,634,166
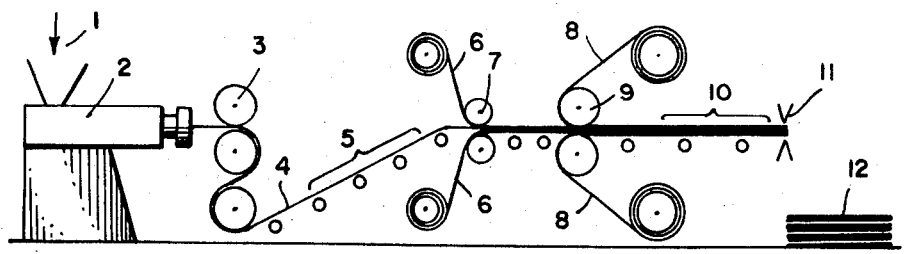
INVENTORS:
HANS FRIELINGSDORF
HEINZ MUELLER-TAMM
DIETER MAHLING
BY
Johnston, Root, O'Keeffe, Keil, Thompson & Shurtleff
ATT'YS

PRODUCTION OF FLAT STRUCTURAL SANDWICH CONSTRUCTIONS

The present invention relates to a process for the production of flat structural sandwich constructions consisting of a. a relatively thick inner ply of thermoplastic;
b. relatively thin adhesion-promoting interlayers firmly applied to both sides of the inner ply; and
c. relatively thin outer plies of a metal firmly attached to the two interlayers.

In known methods of this type, the sandwich panels are prepared using for example an extrusion coating plant. In these methods a board of polyethylene (used as the relatively thick inner ply) first has applied to it a substance promoting adhesion between the polyethylene and the metal outer plies. This adhesion promoter (or bonding agent) is either a contact adhesive or a two-component adhesive based on an epoxide.

The said methods have the disadvantage that they are troublesome and that the bond strength between metal and plastics (polyethylene) leaves much to be desired. When using contact adhesives, only low creep rupture strengths and inadequate resistance to high temperatures are achieved. On the other hand the production of the bond by means of two-component adhesives necessitates the use of elaborate equipment and long curing periods and gives fairly brittle bonds; moreover the resultant sandwich panels are not capable of being deep-drawn. Furthermore, in order to obtain a fairly good bond it has hitherto always been necessary to pretreat the metal and polyethylene surface to be bonded, for example oxidatively.

The present invention has for its object to provide a process of the type described above which does not have the said disadvantages or has them to a far smaller extent.

We have found that the said object is achieved when the outer plies of metal are applied by means of a special adhesion-promoting layer under special process conditions to a special type of polyethylene (used as the relatively thick inner ply).

The present invention comprises a process of the type referred to above wherein sheeting having a thickness of from 1 to 20 mm., preferably from 2 to 8 mm., is continuously prepared by means of a screw extruder at a temperature of the material of from 120° to 220° C., preferably from 160° to 180° C., from a polyethylene having a density of from 0.918 to 0.930 g./cm.³ and a melt index (according to ASTM D 1238-65 T) of from 0.2 to 5, the sheeting thus obtained is continuously covered on both sides by means of a pair of rollers with a film having a thickness of from 0.01 to 0.2 mm., preferably from 0.05 to 0.1 mm., of an ethylene polymer containing carboxyl groups but devoid of polymerized units of esters of ethylenically unsaturated carboxylic acids which has a melting range of from 70° to 130° C., a Shore Hardness C of from 50 to 95 and a modulus of elasticity of from 50 to 2,500 kg./cm.,² the laminate thus obtained is then continuously covered on both sides by means of a pair of rollers at a temperature of the laminate of from 20° to 100° C., preferably from 20° to 60° C., with metal sheeting having a thickness of from 0.05 to 2.5 mm., preferably from 0.1 to 0.8 mm., and a temperature of from 100° to 250° C., preferably from 160° to 200° C., the whole is bonded together to form a sandwich construction under a roller pressure of from 5 to 50 kg./cm., the product thus obtained is brought to a temperature of less than 60° C. and cut into boards having the desired length.

Commercial polyethylene having a density of from 0.918 to 0.930 g./cm.³ and a melt index of from 0.2 to 5 is suitable for carrying out the process according to the invention. The adhesive film consists of a known ethylene polymer which can be processed into film by methods conventionally used for ethylene polymers. Conventional metal sheeting is suitable; for example sheeting of aluminum, copper, brass and steel have proved to be suitable.

Production of the flat structural sandwich constructions may be carried out by means of conventional equipment for making plastics panels at a production rate of up to 2.5 meters per minute. This equipment may in the present case advantageously consist for example of a screw extruder, a system of smoothing rolls, a cooling zone, a pair of rollers for covering the polyethylene sheeting with the adhesive film, a pair of rollers for covering the laminate with the metal sheeting and for sandwich bonding, a cooling zone and cutting means.

In the accompanying drawings, 1 denotes polyethylene granules, 2 is a screw extruder, 3 a system of smoothing rolls, 4 polyethylene sheeting, 5 a cooling zone, 6 an adhesive film, 7 a pair of rollers, 8 metal sheeting, 9 a pair of rollers, 10 a cooling zone, 11 a cutting means and 12 sandwich constructions.

The invention is illustrated by the following example.

EXAMPLE

Sheeting having a thickness of 3 mm. is prepared continuously from a polyethylene having a density of 0.918 g./cm.³ and a melt index of 1.5 on a screw extruder having a screw 90 mm. in length and a sheeting die having a width of 600 mm., after which the sheeting is smoothed and brought to a temperature of about 60° C. The sheeting is then continuously covered on both sides with a film having a thickness of 0.1 mm. of an ethylene polymer containing carboxyl groups but devoid of polymerized units of esters of ethylenically unsaturated carboxylic acids and having a melting range of from 98° to 104° C., a Shore Hardness C of 77 and a modulus of elasticity of 1,850 kg./cm.². The laminate obtained is continuously covered on both sides with aluminum sheeting having a temperature of 190° C. by means of a pair of rollers having a temperature of 190° C., the temperature of the laminate being about 60° C. The whole is combined into a sandwich construction under a roller pressure of about 20 kg./cm., brought to about 40° C. and cut up into panels. The output of the screw extruder is about 180 kg. of polyethylene per hour. The corresponding production rate is 1.6 meters per minute.

We claim:

1. A process for the production of flat structural sandwich constructions consisting of (a) a relatively thick inner ply of thermoplastic polymer; (b) relatively thin adhesion-promoting interlayers firmly applied to both sides of the inner ply and (c) relatively thin outer plies of a metal firmly applied to the two interlayers, which comprises extruding polyethylene sheeting having a thickness of from 1 to 20 mm. at a temperature of the material of from 120° to 220° C., said polyethylene having a density of from 0.918 to 0.930 g./cm.³ and a melt index (according to ASTM D 1238–65 T) of from 0.2 to 5, covering the sheeting thus obtained on both sides between a pair of rollers with an ethylene polymer film having a thickness of from 0.01 to 0.2 mm., said ethylene polymer containing carboxyl groups but devoid of polymerized units of esters of ethylenically unsaturated carboxylic acids and having a melting range of from 70° to 130° C., a Shore Hardness C of from 50 to 95 and a modulus of elasticity of 50 to 2,500 kg./cm.², covering the laminate thus obtained on both sides between a pair of rollers at a temperature of the laminate of from 20° to 100° C. with metal sheeting having a thickness of from 0.05 to 2.5 mm. and a temperature of from 100° to 250° C., bonding the composite plies into a sandwich construction under a roller pressure of from 5 to 50 kg./cm., bringing the product obtained to a temperature of less than 60° C. and cutting the product into panels having the desired dimensions.

2. A process as claimed in claim 1 wherein the polyethylene sheeting has a thickness of from 2 to 8 mm.

3. A process as claimed in claim 1 wherein the temperature of the extruded polyethylene sheeting is from 160° to 180° C.

4. A process as claimed in claim 1 wherein the film of ethylene polymer has a thickness of from 0.05 to 0.1 mm.

5. A process as claimed in claim 1 wherein the temperature of the laminate during covering with metal sheeting is from 20° to 60° C.

6. A process as claimed in claim 1 wherein the metal sheeting has a thickness of from 0.1 to 0.8 mm.

7. A process as claimed in claim 1 wherein the metal sheeting has a temperature of from 160° to 200° C.

* * * * *